(12) United States Patent
Sahara

(10) Patent No.: US 8,520,274 B2
(45) Date of Patent: Aug. 27, 2013

(54) IMAGE SCANNING APPARATUS

(75) Inventor: Shinya Sahara, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 279 days.

(21) Appl. No.: 13/036,531

(22) Filed: Feb. 28, 2011

(65) Prior Publication Data

US 2011/0211238 A1    Sep. 1, 2011

(30) Foreign Application Priority Data

Feb. 26, 2010    (JP) ................................. 2010-041669

(51) Int. Cl.
*H04N 1/42* (2006.01)
*H04N 1/00* (2006.01)

(52) U.S. Cl.
USPC ............................. 358/498; 358/1.6; 358/474

(58) Field of Classification Search
USPC ........................................................ 358/498
See application file for complete search history.

(56) References Cited

U.S. PATENT DOCUMENTS

| | | | |
|---|---|---|---|
| 2004/0190084 A1* | 9/2004 | Shirai | 358/474 |
| 2005/0134871 A1* | 6/2005 | Nakagiri | 358/1.6 |
| 2009/0231638 A1 | 9/2009 | Umezawa | |
| 2009/0310194 A1* | 12/2009 | Shimizu et al. | 358/498 |

FOREIGN PATENT DOCUMENTS

| | | |
|---|---|---|
| JP | A-9-214673 | 8/1997 |
| JP | A-11-27444 | 1/1999 |
| JP | 2005-167727 | 6/2005 |
| JP | A-2006-86734 | 3/2006 |
| JP | 2007-281718 | 10/2007 |
| JP | 2009-218955 | 9/2009 |
| JP | 2009-223691 | 10/2009 |
| JP | A-2009-303093 | 12/2009 |

OTHER PUBLICATIONS

English Translation of JP 2007-281718 A.*
Notification of Reasons for Refusal dated Feb. 7, 2012 received from the Japanese Patent Office from related Japanese Application No. 2010-041669, together with an English-language translation.
Japanese Decision of Patent Grant dated May 31, 2012 together with an English language translation.

* cited by examiner

*Primary Examiner* — Marivelisse Santiago Cordero
*Assistant Examiner* — Moustapha Diaby
(74) *Attorney, Agent, or Firm* — Scully, Scott, Murphy & Presser, P.C.

(57) ABSTRACT

An image scanning apparatus includes: a feeding unit; an upstream scanning unit that scans an image of one surface of the document; a downstream scanning unit, which is arranged at a downstream side, and which scans an image of the other surface of the document; a memory unit, which stores both data of the upstream scanning unit and data of the downstream scanning unit; and a control unit that controls the document feeding by performing one of a first feeding process and a second feeding process, wherein the first feeding process is a feeding process in which the upstream scanning unit starts to scan a following document while the downstream scanning unit scans a preceding document, and wherein the second feeding process is a feeding process in which the upstream scanning unit starts to scan the following document after the downstream scanning unit scans the preceding document.

8 Claims, 8 Drawing Sheets

IMAGE SCANNING APPARATUS

CROSS-REFERENCE TO RELATED APPLICATION

This application claims priority from Japanese Patent Application No. 2010-041669 filed on Feb. 26, 2010, the entire subject matter of which is incorporated herein by reference.

BACKGROUND

Technical Field

The present invention relates to an image scanning apparatus performing a double-sided scanning operation. More specifically, the present invention relates to an image scanning apparatus having at least two scanning units in which one scanning unit scans one surface of a document and the other scanning unit scans the other surface, thereby performing a double-sided scanning in one pass.

In a related image scanning apparatus performing a double-sided scanning, the related image scanning apparatus that scans a front face and a reverse face of a document in one pass is known. For example, the related image scanning apparatuses is an image scanning apparatus having two scanning units on a document feed path wherein one scanning unit scans a front face of a document and the other scanning unit scans a reverse face thereof, thereby performing a double-sided scanning in one pass.

SUMMARY

However, the above-described image scanning apparatus has following problems. In the image scanning apparatus performing a double-sided scanning of a document by two scanning units, the productivity of scanning is improved since it is not necessary to turn the document over. However, much data is handled in a short time, and a load of a memory is increased. Accordingly, a memory shortage may occur, and the document feeding may be stopped on the way. Interrupting the operation and resuming the document feeding cause a change in the scanning speed, so that a quality of scanning may be deteriorated. In the meantime, when the scanning of the other scanning unit starts after waiting for completion of the scanning by one scanning unit to reduce the load of the memory, the productivity is lowered.

The present invention is made to solve the above problems of the related image scanning apparatus. An object of the present invention is to provide an image scanning apparatus capable of avoiding an interrupting the document feeding and improving productivity of scanning.

In the present invention made with consideration of the above problem, one aspect of the present invention includes: a feeding unit that feeds a document; an upstream scanning unit that scans an image of one surface of the document fed by the feeding unit; a downstream scanning unit, which is arranged at a downstream side of the upstream scanning unit in a document feeding direction, and which scans an image of the other surface of the document fed by the feeding unit; a memory unit, which stores both data of the image scanned by the upstream scanning unit and data of the image scanned by the downstream scanning unit; and a control unit that controls the document feeding by performing one of a first feeding process and a second feeding process, based on at least one of an unused-capacity of the memory unit and an output condition, wherein the first feeding process is a feeding process in which the upstream scanning unit starts to scan a following document while the downstream scanning unit scans a preceding document, and wherein the second feeding process is a feeding process in which the upstream scanning unit starts to scan the following document after the downstream scanning unit scans the preceding document.

The image scanning apparatus in one aspect of the present invention can scan both sides of a document in one pass by the upstream scanning unit and the downstream scanning unit and perform. As a feeding process of the document in performing the double-sided scanning, the first feeding process in which the upstream scanning unit starts to scan the following document while the downstream scanning unit scans the preceding document, and the second feeding process in which the upstream scanning unit starts to scan the following document after the downstream scanning unit scans the preceding document. The image scanning apparatus switches the feeding processes based on at least one of the unused-capacity of the memory unit and an output condition (such as output order or printing speed).

In other words, the image scanning apparatus in the aspect of the present invention can switch the first feeding process and the second feeding process, as necessary. For example, when the unused-capacity of the memory is greater than a predetermined value, the image scanning apparatus performs the first feeding process with priority on the productivity of scanning. In the meantime, when the unused-capacity of the memory is equal to or smaller than the predetermined value, the image scanning apparatus performs the second feeding process in order to reduce a risk of the interrupting the feeding. In addition, in case that an output condition needs large capacity of the memory (for example, reverse order printing case as described below), the second feeding process may be performed in order to reduce a risk of interrupting the feeding. In addition, in case that an output condition needs much time to perform the printing (for example, high resolution printing case or cardboard printing case), even when the scanning is performed at high speed by the first feeding process, the effect of the high speed scanning is little by the longer printing time, so that the second feeding process may be performed with priority on the quality of scanning. Accordingly, the image scanning apparatus can perform at least two feeding processes and switch appropriately the feeding processes, thereby improving the productivity and quality of scanning.

[JP0012]
Accordingly, the image scanning apparatus of the present invention can avoid interrupting the feeding of a document and improve productivity of scanning.

DETAILED DESCRIPTION OF EXEMPLARY EMBODIMENTS

[JP0016]

Hereinafter, exemplary embodiments of an image scanning apparatus of the present invention will be described with reference to the drawings. The exemplary embodiments relate to a Multi Function Peripheral (hereinafter referred as to MFP) having a scanning function and a printing function to which the present invention is applied.

[Configuration of MFP]

Figure 1:
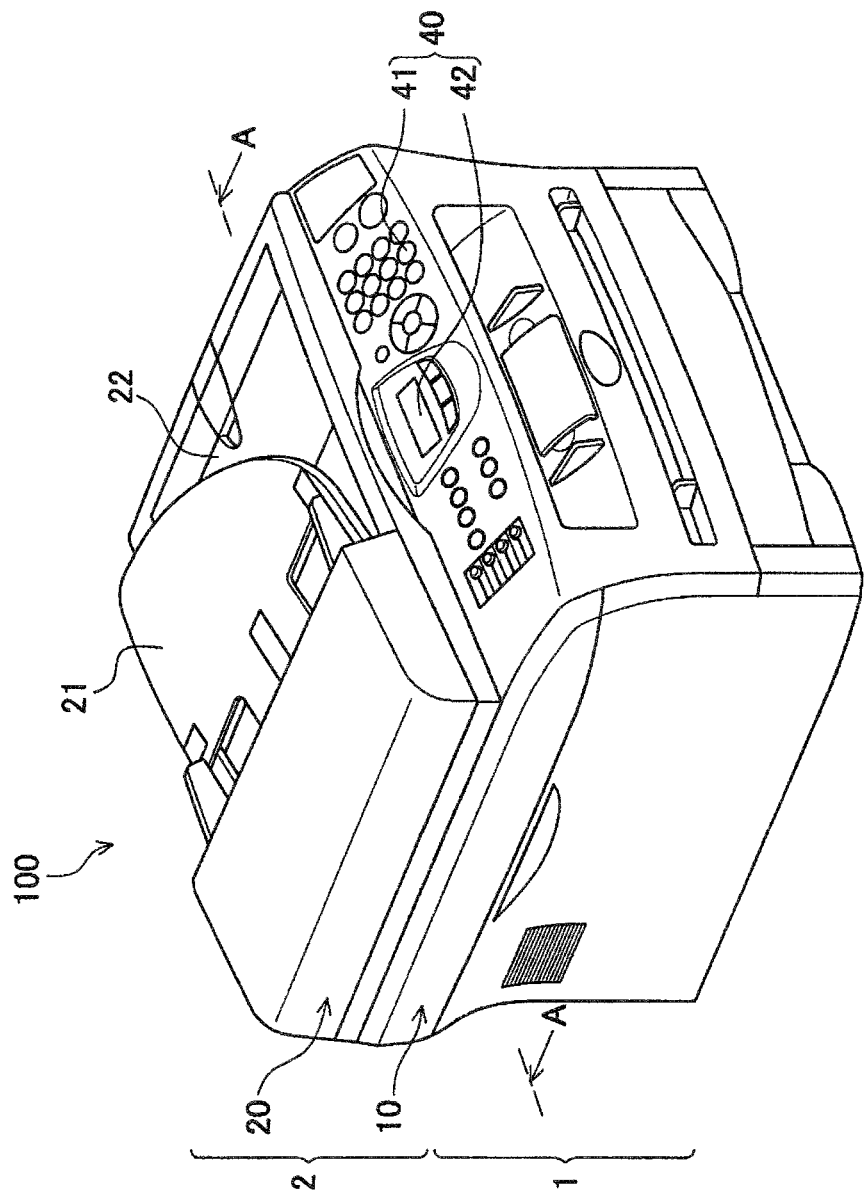
FIG. 1 is a perspective view showing an external appearance of a Multi-Function Peripheral (hereinafter referred to as MFP) according to an exemplary embodiment.

As shown in FIG. 1, a MFP 100 in the exemplary embodiment includes an image forming unit 1 that prints an image on a sheet and an image scanning unit 2 (an example of an image scanning unit) that scans an image of a document. An image forming method of the image forming unit 1 may be an electro-photography method or inkjet method.

A front side of the MFP 100 has a button group 41 including a variety of buttons (for example, start key, stop key and ten keys) and an operation panel 40 including a display unit 42 configured by liquid crystal display, etc. By using the display unit 42 or button group 41, it can display an operation status and input the operation by the user.

[Configuration of Image Scanning Unit]

Figure 2:
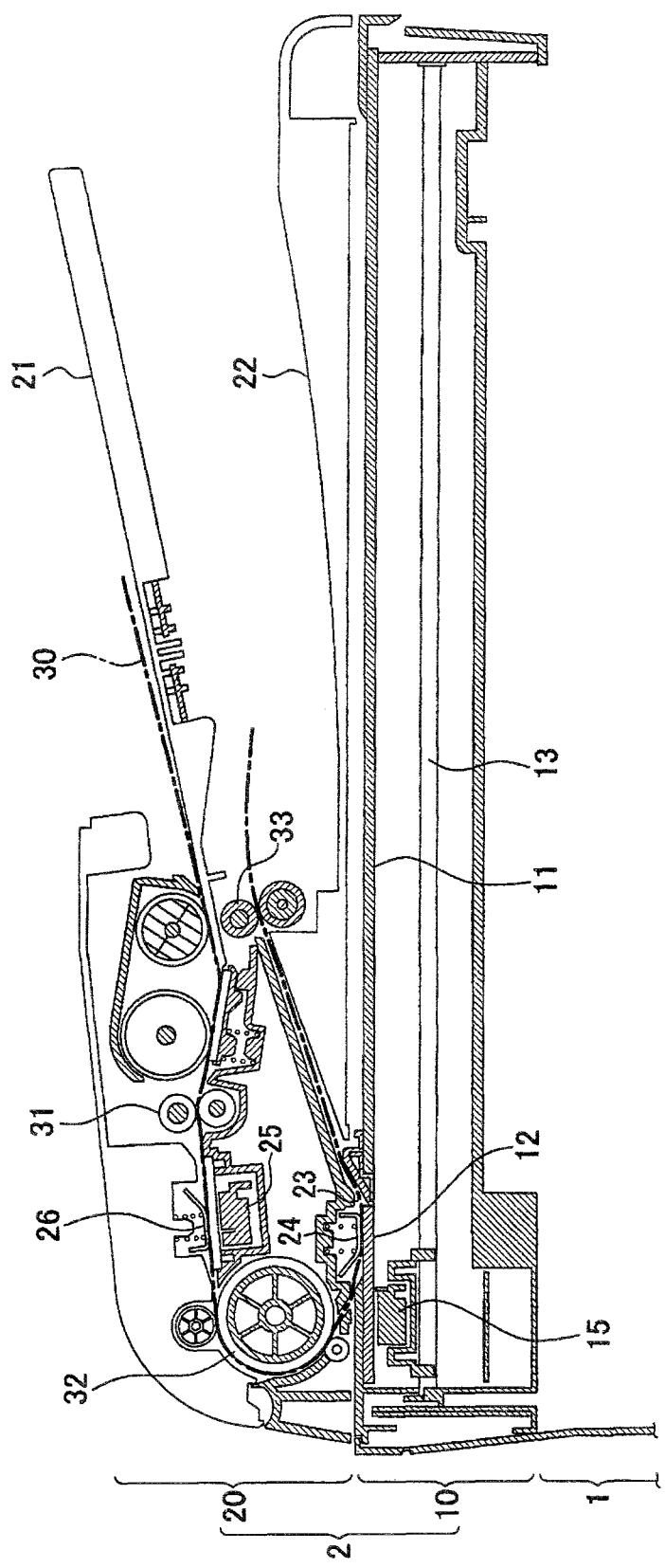
FIG. 2 is a sectional view showing an internal configuration (cross section along a line A-A) of an image scanning unit of the MFP shown in FIG. 1.

The configuration of the image scanning unit 2 will be described with reference to FIG. 1 and FIG. 2. The image scanning unit 2 has a main body unit 10 that scans an image and an Auto Document Feeder (hereinafter referred to as ADF; an example of a feeding unit) 20 that performs automatic feeding of the document.

The main body unit 10 has contact glasses 11, 12 at its upper surface. Further, a first image sensor 15 (an example of a downstream scanning unit) that scans an image of a document is provided in the main body unit 10 and below the contact glasses 11, 12. The first image sensor 15 includes optic devices aligned in a line in a main scanning direction (a direction orthogonal to a document feeding direction, a depth direction of FIG. 2), converts reflective light from the document into an electric signal, and outputs the electric signal. A Contact Image Sensor (CIS) or Charge Coupled Device (CCD) may be used as the first image sensor 15.

The first image sensor 15 is supported slidably to a slide shaft 13. The slide shaft 13 is provided in a sub-scanning direction (a document feeding direction, a left-right direction of FIG. 2). Both end portions of the slide shaft are fixed to a housing of the main body unit 10. Accordingly, the first image sensor 15 is movable in the left and right direction of FIG. 2.

The ADF 20 includes a document inlet 21 in which the document to be scanned is set and a discharge outlet 22 in which scanned documents are discharged. Specifically, the document inlet 21 is provided above the discharge outlet 22.

Further, a document feed path 30 is provided in the ADF 20. The document feed path 30 (dashed-dotted line) has an approximate U shape and connects the document inlet 21 and the discharge outlet 22. In the feed path 30, an entry roller 31, a main roller 32 and a discharge roller 33 are provided in that order from an upstream of the document feeding direction.

Also, an opening 23 is provided at lower surface of the ADF 20, and a document pushing plate 24 is arranged to expose from the opening 23. The document pushing plate 24 is provided between the downstream of the main roller 32 and the upstream of the discharge roller 33 in the document feeding direction, and the document pushing plate 24 faces the ADF glass 12 in case that the ADF 20 is closed.

The ADF 20 picks up the documents set on the document inlet 21 one at a time by the entry roller 31 and causes the document to U-turn along the main roller 32. Then, the ADF feeds the document to a position facing to the contact glass 12 of the main body unit 10 (hereinafter, referred to as "ADF glass 12"). Specifically, the ADF causes the document to pass between the document pushing plate 24 and the ADF glass 12. Then, the ADF discharges the document to the discharge outlet 22 via the discharge roller 33.

The document scanning method using the first image sensor 15 includes a flat bed method (document-fixed scanning method) and an ADF method (document moving scanning method). For the flat bed method, the documents are set on the contact glass 11 (hereinafter, referred to as "FB glass 11") one by one. At this state, the first image sensor 15 is moved in the sub-scanning direction and an image of the document is scanned line by line in the sub-scanning direction. On the other hand, for the ADF method, the documents to be scanned are set on the document inlet 21. Then, the first image sensor 15 is moved to a position facing to the ADF glass 12 and fixed. At this state, the document is fed to the position below the document pushing plate 24 and facing to the ADF glass 12, by the ADF 20. An image of the document is scanned line by line in the main-scanning direction at the time.

Further, the ADF 20 includes a second image sensor 25 (an example of an upstream scanning unit), which scans an image of a document, and a document pushing plate 26 facing to the second image sensor 25 in the downstream of the entry roller 31 and the upstream of the main roller 32 with respect to the document feeding direction. The second image sensor 25 and the document pushing plate 26 are arranged to pass the document therebetween. Similar to the first image sensor 15 of the main body unit 10, a CIS or CCD may be used as the second image sensor 25.

[JP0030]

The second image sensor 25 is arranged at a position to scan the other surface different from the one surface to be scanned in the ADF method by using the first image sensor 15. Accordingly, the image scanning unit 2 may scan one side of a document by the first image sensor 15 of the main body unit 10 and may scan the other side by the second image sensor 25 in the ADF 20 at one pass, respectively. Consequently, the image scanning unit may perform a double-sided scanning in one pass. Hereinafter, one surface scanned by the first image sensor 15 is referred as a first surface, and the other surface scanned by the second image sensor 25 is referred as a second surface.

[Electric Configuration of Image Scanning Unit]

Figure 3:
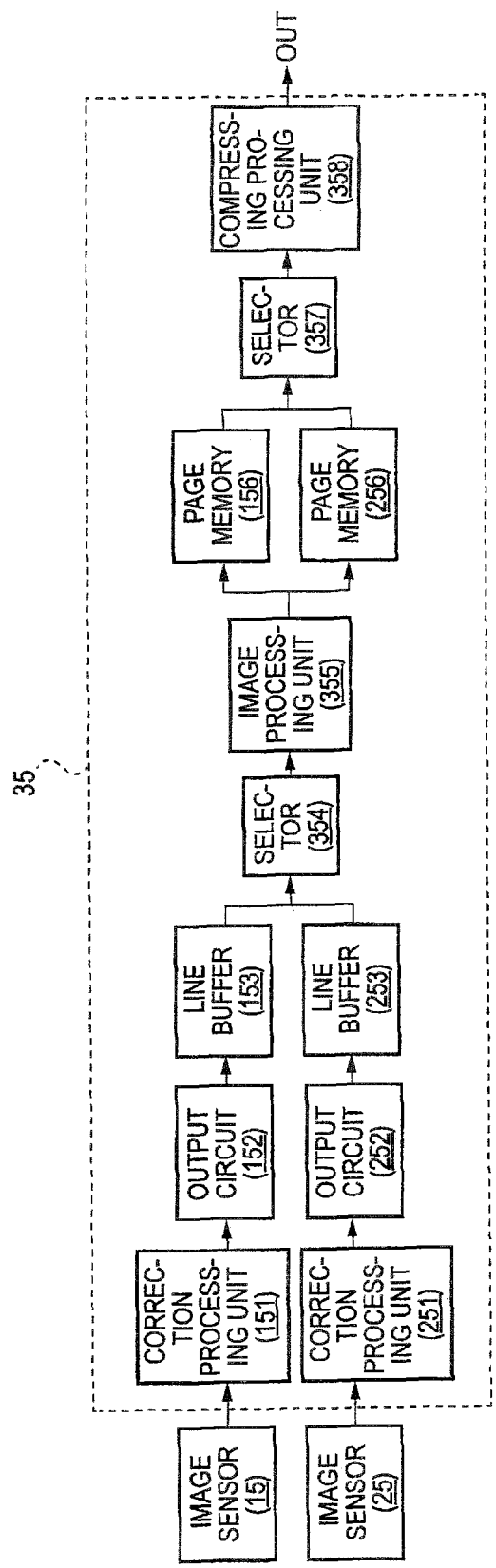
FIG. 3 is a block diagram showing an electric configuration of the image scanning unit.

Continuously, the electric configuration of the image scanning unit 2 will be described. As shown in FIG. 3, the image scanning unit 2 has a data processing unit 35 including correction processing units 151, 251, output circuits 152, 252, line buffers 153, 253, selectors 354, 357, an image processing unit 355, page memories 156, 256 (an example of a memory unit) and a compression processing unit 358.

The correction processing units 151, 251 perform a variety of correction processing (for example, black correction, white correction, reduction, gamma correction and the like). The line buffers 153, 253 store image data of one or more lines. The image processing unit 355 performs a variety of image processing (such as color conversion, writing correction, and binarization). The page memories 156, 256 store image data of one or more pages. The compression processing unit 358 compresses image data of one page.

The data processing unit 35 is configured by both a first scanning system, which processes image data of a first surface scanned by the first image sensor 15, and a second scanning system, which processes image data of a second surface scanned by the second image sensor 25, as shown in FIG. 3. The first scanning system outputs data of the first surface output from the first image sensor 15 to the image forming unit 1 through the correction processing unit 151, the output circuit 152, the line buffer 153, the selector 354, the image processing unit 355, the page memory 156 (an example of the second memory area), the selector 357 and the compression processing unit 358. The second scanning system outputs data of the second surface output from the second image sensor 25 to the image forming unit 1 through the correction processing unit 251, the output circuit 252, the line buffer 253, the selector 354, the image processing unit 355, the page memory 256 (an example of the first memory area), the selector 357 and the compression processing unit 358. The image forming unit 1 receives the page data one by one from the image scanning unit 2 and prints immediately the received data.

The image processing unit 355 and the compression processing unit 358 are shared by the first scanning system and the second scanning system. Accordingly, the selector 354 acquires the data in each line and transfers alternately the first surface data and the second surface data to the image processing unit 355. The selector 357 acquires the data in each page and transfers alternately the first surface data and the second surface data to the compression processing unit 358.

The page memories 156, 256 are memory areas, which are parts of the memory of the image scanning unit 2, and which are secured respectively for the first image sensor 15 and the second image sensor 25. In other words, the page memories 156, 256 occupy a part of the memory that is also used by the other processes. Accordingly, as the size of the page memories 156, 256 in the memory become larger, the load is applied to the other processes and a memory shortage may occur more easily. In the meantime, the smaller the sizes of the page memories 156, 256, the less the situation of memory shortage occurs.

In the meantime, the configuration of the data processing unit 35 is exemplary and is not limited to the above. For example, in the above configuration, the image processing unit 355 and the compression processing unit 358 are shared. However, the image processing unit and the compression processing unit may be independently provided in the first scanning system and the second scanning system, respectively. In addition, the correction processing units and the output circuits may be shared by the first scanning system and the second scanning system. Further, the line buffers 153, 253 may be dedicated memories or may be parts of the memory shared by other processing, as the page memories 156, 256.

[Double-Sided Simultaneous Scanning Operation of MFP]

The double-sided scanning operation of the image scanning unit 2 of the MFP 100 will be described. A document is carried-in from the document tray 21. The MFP 100 scans each surface of the document to perform a double-sided scanning in order of a second surface scanning by the second image sensor 25 and a first surface scanning by the first image sensor 15.

Figure 4:
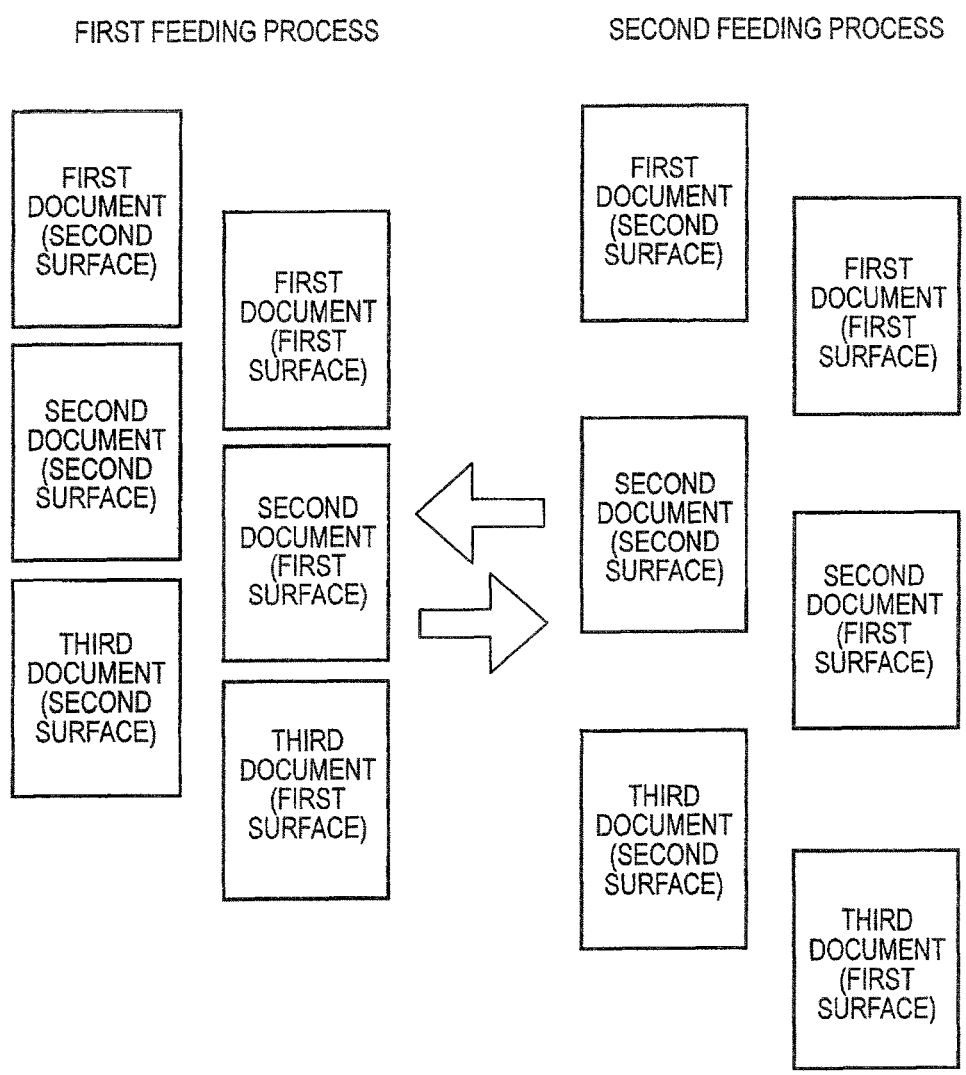
FIG. 4 is a view showing two feeding processes (a first feeding process and a second feeding process) of the image scanning unit.

The MFP 100 switches the feeding processes of the document, as required. Specifically, as shown in FIG. 4, the MFP 100 can perform a feeding process of the document in performing the double-sided scanning. Thus, the MFP 100 can perform a "first feeding process" in which the second image sensor 25 starts to scan a second surface of a following document while the first image sensor 15 scans a first surface of a preceding document, and a "second feeding process" in which the second image sensor 25 starts to scan a second surface of a following document after the first image sensor 15 scans a first surface of a preceding document.

In the first feeding process, the scanning of the following document is started during the scanning of the preceding document, so that a distance between sheets is narrower, compared to the second feeding process. Thus, the scanning can be completed at an early time, compared to the second feeding process. In other words, the first feeding process is a high-speed feeding, compared to the second feeding process, so that it can expect improvement on the productivity.

In some cases, the memory usage in the first feeding process is greater than that of the second feeding process. For example, in case that the image forming unit 1 forms images in order of the first surface and the second surface, the order is reverse to the order of scanning in the exemplary embodiment. Accordingly, when performing the first feeding process in above case, the image scanning unit 2 cannot transfer the image data to the image forming unit 1 at the scanning of the second surface of the preceding document, and thus the operation processing waits for the scanning the first surface. Additionally, in the first feeding process, a scanning operation of a following document starts without waiting for the scanning completion of the preceding document. Accordingly, a memory area for a second surface of the following document is required. Therefore, in the first feeding process in above case, memory areas for at least one page of the first surface and two pages of the second surface are required. On the other hand, in the second feeding process, the scanning operation of the following document starts after the scanning of the preceding document is completed, so that memory areas for one page of the first surface and one page of the second surface are only required. Accordingly, the MFP 100 performs basically the document feeding in the first feeding process, and switches to the second feeding process depending on the output conditions.

[Double-Sided Scanning Process]

Hereinafter, a double-sided scanning process (an example of a control unit and a detection unit) with switching the feeding process will be described with reference to a flow chart of FIG. 5. The double-sided scanning process is executed when a user sets documents on the document tray 21 and selects a double-sided scanning operation.

First, it is determined whether a setting in which a scanning order of the image scanning unit 2 is reverse to a printing order of the image forming unit 1 (step S101). In the MFP 100 of this exemplary embodiment, the scanning is performed in order of a second surface and a first surface. Accordingly, it is determined whether a condition of performing a printing in order of a first surface and a second surface is set. For example, when a one-sided printing of a double-sided scanning is set, a first surface is first printed, so that it is determined that a reverse order is set.

When it is determined that a reverse order is set (step S101: YES), it is determined whether a low-speed printing is set (step S102). Regarding the determination of the low-speed printing, when an output speed of an image is smaller than a threshold value, it is determined that a low-speed printing is set, and when an output speed of an image is greater than a threshold value, it is determined that a low-speed printing is not set. Cases of the low-speed printing includes a high-resolution printing in which resolution is equal to or greater than a prescribed value and a printing for a cardboard which takes a predetermined time to perform a fixing operation.

When it is determined that a low-speed printing is set (step S102: YES), memory areas for two pages are secured (step S103). In other words, a memory area for one page of the first surface is secured in the page memory 156 and a memory area for one page of the second surface is secured in the page memory 256, respectively. In the meantime, when it is determined that a low-speed printing is not set (step S102: NO), memory areas for three pages are secured (step S113). In other words, memory areas for one page of the first surface and two pages of the second surface are secured. After securing the memory areas in step S103 or step S113, a document feeding process by one of the first feeding process and the second feeding process is performed (step S104).

Here, the document feeding process of step S104 will be described in details with reference to a flow chart of FIG. 6. First, one document is carried-in and the document feeding starts (step S201). When the document feeding starts, the second image sensor 25 first scans a second surface of the document. Then, the processing stands by until the scanning of the second surface is completed (step S202). During the step S202, a scanning operation of a first surface also starts and the second surface and first surface scanning operations are performed at the same time.

In the meantime, after a rear end portion of the document (which is preceding document) is left from the entry roller 31, the entry roller 31 picks up a leading end portion of a next document (which is following document) and the next document waits for carrying-in. In other words, the following document stands by just before the second image sensor 25.

After the second surface scanning is completed, it is determined whether the scanned second surface is a blank sheet (step S203). In step S203, for example, when a ratio of white and similar color thereof in the whole image is equal to or greater than a threshold value, it is determined that the scanned second surface is a blank sheet. When it is determined that the scanned second surface is a blank sheet (step S203: YES), the data of the scanned second surface is deleted (step S231).

When it is determined that the scanned second surface is not a blank sheet (step S203: NO) or after step S231, it is determined whether there is an unused-capacity for one page in the memory area (step S204). In step S204, when memory areas for three pages are secured, a memory area for one page is secured even if the image data of two pages for both the first surface and the second surface of the preceding document is stored. Accordingly, even if the preceding document is being scanned, it can start the scanning of the following document.

Accordingly, when it is determined that there is an unused-capacity for one page in the memory area (step S204: YES), a feeding operation of the following document, which is a next document, starts (step S206). Since the following document stands by just before the image sensor 205, a second surface scanning of the following document starts immediately after the second surface scanning of the preceding document is completed. After that, the processing stands by until the first surface scanning of the preceding document is completed (step S206). In the meantime, when there is no following document in step S205, the processing proceeds to step S206. Additionally, when it is determined that there is not the unused-capacity for one page in the memory area (step S204: NO), a next document is not fed, and the processing stands by until the first surface scanning of the preceding document is completed (step S206).

After the first surface scanning is completed, the data of the first surface is transmitted to the image forming unit 1 (step S207). After all data of the first surface is transmitted, it is again determined whether the second surface is a blank sheet (step S208). When it is determined that the second surface is not a blank sheet (step S208: NO), the data of the second surface is transmitted to the image forming unit 1 (step S209). When it is determined that the second surface is a blank sheet (step S208: YES), only page end data is transmitted to the image forming unit 1 (step S241) since the data of the second surface has been deleted in step S231.

After step S209 or step S241, it is determined whether the feeding operation of a following document, which is a next document, has started (step S210). When it is determined that the feeding operation of a following document has started (step S210: YES), the processing returns to step S202 and stands by until the second surface scanning of the following document is completed.

In the meantime, when it is determined that the feeding operation of a following document has not started (step S210: NO), it is determined whether there is a next document (step S211). When it is determined that there is a next document (step S211: YES), the processing returns to step S201 and a feeding operation of the next document starts. When it is determined that there is not a next document (step S211: NO), the document feeding process is ended. Consequently, the processing returns to the double-sided scanning process in FIG. 5, and the processing ends the double-sided feeding process.

Figure 6:
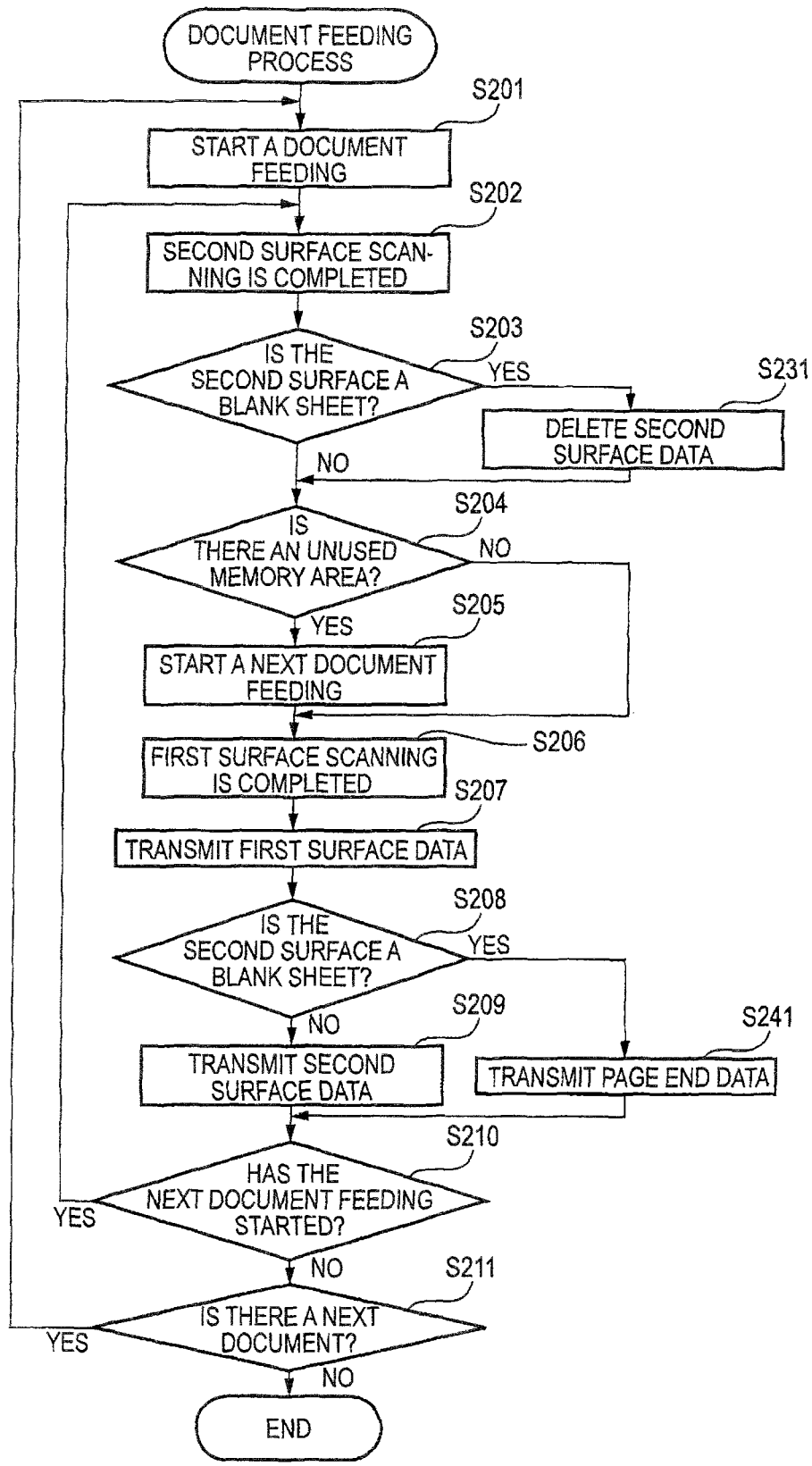
FIG. 6 is a flow chart showing a sequence of a document feeding process of the MFP.

In the document feeding process shown in step S104 of FIG. 6, when the memory areas for three pages are secured, an unused area of one page is secured even in the step S204 (between the completion of scanning of the second surface of the preceding document and the scanning of the first surface). Accordingly, the processing proceeds to step S205 and a feeding operation of the following document starts. Therefore, the first feeding process is performed. In contrast, when only memory areas for two pages are secured in the entire process, an unused area for one page is not secured in the step S204. Accordingly, a feeding operation of the following document does not start. After scanning and transmitting the image data of double-sides, a scanning operation of the following document starts at return to the step S201. Therefore, the second feeding process is performed.

Like this, the MFP 100 switches the feeding processes based on the printing speed when the reverse order is set. Namely, it takes a time to output an image in the low-speed printing, so that even if the scanning is performed at high speed, it is difficult to give the benefit. Thus, the second feeding process is performed with the memory areas for only two pages. On the other hand, in case that the low-speed printing is not set, the memory areas for three pages are secured to perform the first feeding process with priority on the productivity.

Additionally, when the second surface is a blank sheet, the image data of the second surface is deleted, and an unused area for at least one page is acquired. Accordingly, even if memory areas for only two pages are secured (i.e., the second feeding process is performed), an unused area for one page is acquired in step S204. Thus, when the feeding operation of the following document starts, a distance between the documents is narrower at the feeding of the following document. Namely, the high speed operation is achieved.

Figure 5:
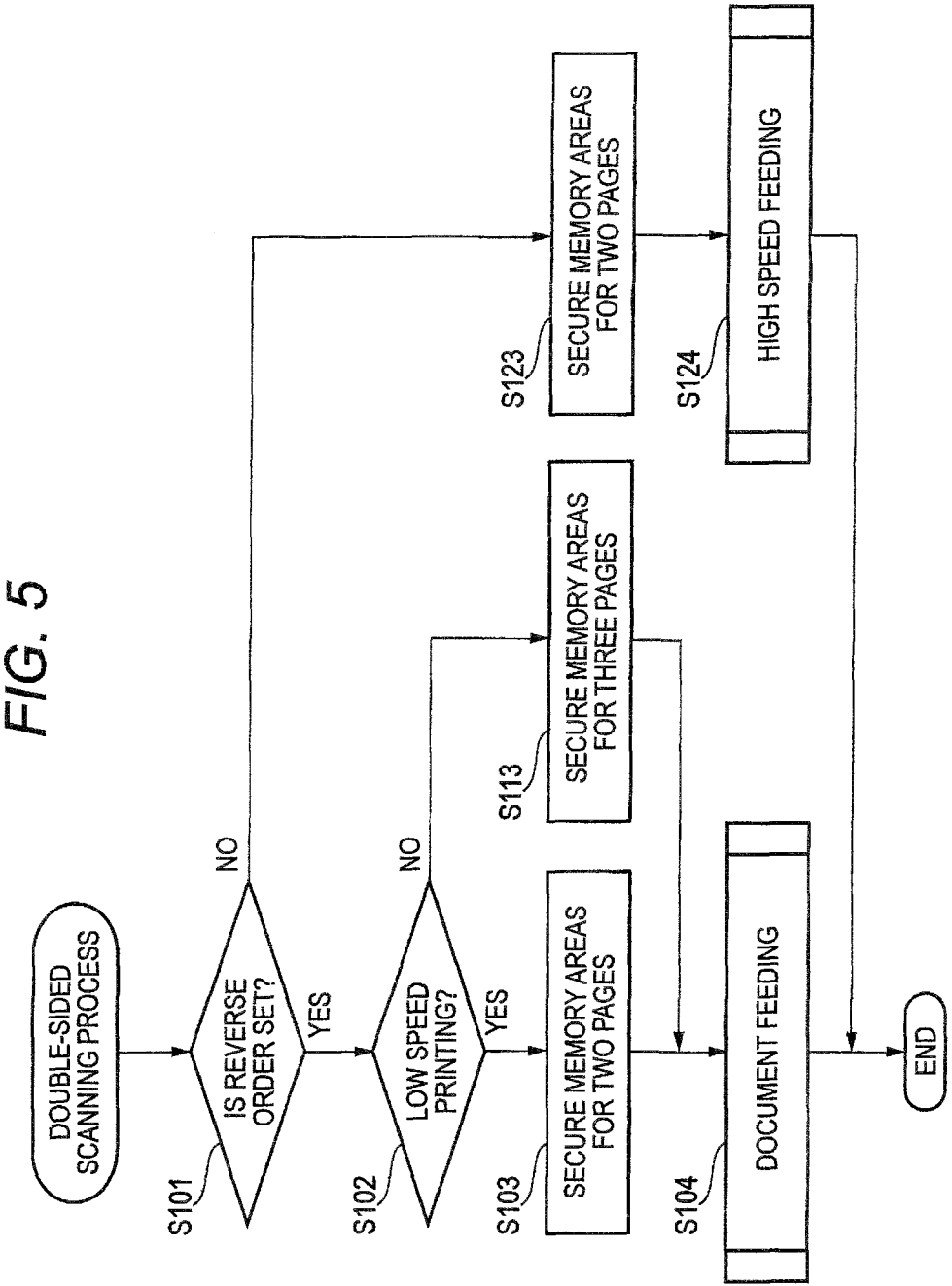
FIG. 5 is a flow chart showing a sequence of a double-sided scanning process of the MFP.

Return to the description of the double-sided scanning process in FIG. 5, when it is determined that the scanning order is not reverse to the printing order (step S101: NO), memory areas for two pages are secured (step S123). Then, a high-speed feeding process of feeding the document as the first feeding process is performed (step S124).

Figure 7:
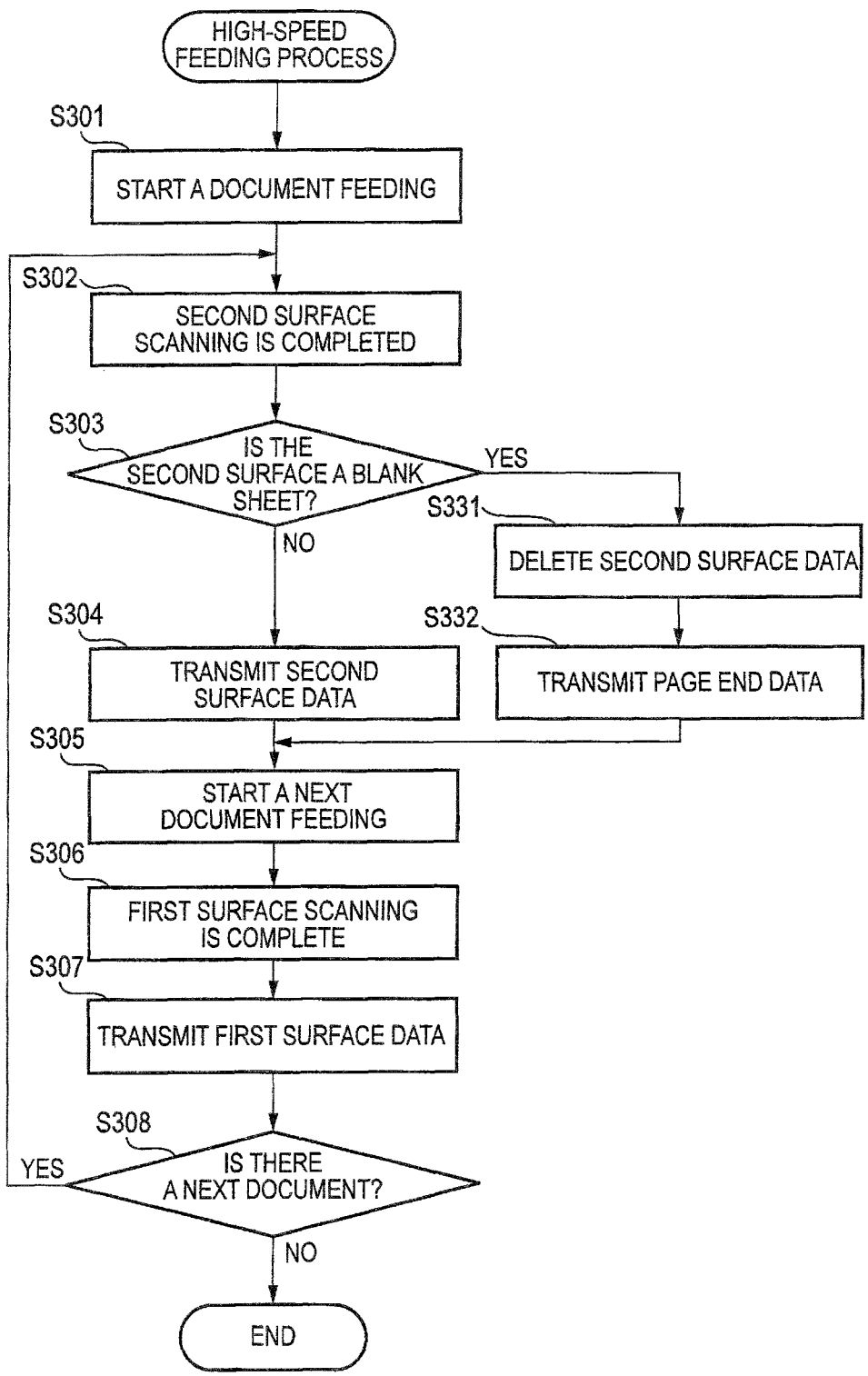
FIG. 7 is a flow chart showing a sequence of a high-speed feeding process of the MFP.

Hereinafter, the high-speed feeding process of step S124 will be described in detail with reference to a flow chart of FIG. 7. First, one sheet is carried-in and a feeding operation of the document starts (step S301). When the feeding operation of the document starts, the second image sensor 25 scans a second surface of the document. Then, the processing stands by until the second surface scanning is completed (step S302).

After the second surface scanning is completed, it is determined whether the scanned second surface is a blank sheet (step S303). When it is determined that the second surface is a blank sheet (step S303: YES), the data of the scanned second surface is deleted (step S331). Then, only the page end data is transmitted to the image forming unit 1 (step S332). When it is determined that the second surface is not a blank sheet (step S303: NO), the data of the second surface is transmitted to the image forming unit 1 (step S304).

After step S304 or step S332, a feeding operation of a following document, which is a next document, starts (step S305). After that, the processing stands by until the first surface scanning of the preceding document is completed (step S306). After the first surface scanning is completed, the data of the first surface is transmitted to the image forming unit 1 (step S307).

After all data of the first surface is transmitted, it is determined whether there is a next document (step S308). When it is determined that there is a next document (step S308: YES), the processing returns to step S302 and stands by until a second surface scanning is completed. When it is determined that there is no next document (step S308: NO), the high-speed feeding process is ended. In addition, the processing returns to the double-sided scanning process in FIG. 5, and ends the double-sided feeding process.

Accordingly, the MFP 100 performs the document feeding by using the memory areas for two pages when the regular order is set. In other words, when the regular order is set, it can transmit the image data without waiting for the scanning completion of the first surface, after completing the second surface scanning. Then, the feeding operation of the following document starts without waiting for the scanning completion of the first surface. Thus, the first feeding process is performed.

As described above, the image scanning unit 2 of the MFP 100 of this exemplary embodiment can switch the first feeding process corresponding to the high-speed feeding and the second feeding process in which the amount used of the memory is smaller. Specifically, according to this exemplary embodiment, in the case of the reverse order output and low-speed printing, the second feeding process is performed, and the first feeding process is performed for the other cases. In other words, in case that the benefit of the high-speed scanning is little, the second feeding process is performed to reduce the risk of the interrupting the feeding. Like this, at least two feeding processes can be performed and switched as required, so that it can achieve the balance between the productivity and the quality of scanning.

In the meantime, the above exemplary embodiment is just exemplary and is not to limit a scope of the present invention. Accordingly, the present invention can be variously modified and changed without departing from the scope of the present invention. For instance, the scope of the present invention is not limited to the MFP and can be applied to an apparatus having an image scanning function, such as copier, scanner, FAX and the like.

In the above exemplary embodiment, the second image sensor 25 is arranged at upstream of the first image sensor 15 used in both the ADF scanning and the flat bed scanning in the document feeding direction. However, the second image sensor 25 may be arranged at downstream of the first image sensor 15. In this case, since the scanning is performed in order of the first surface and the second surface, a reverse order printing is corresponding to in order of the second surface and the first surface.

Figure 8:
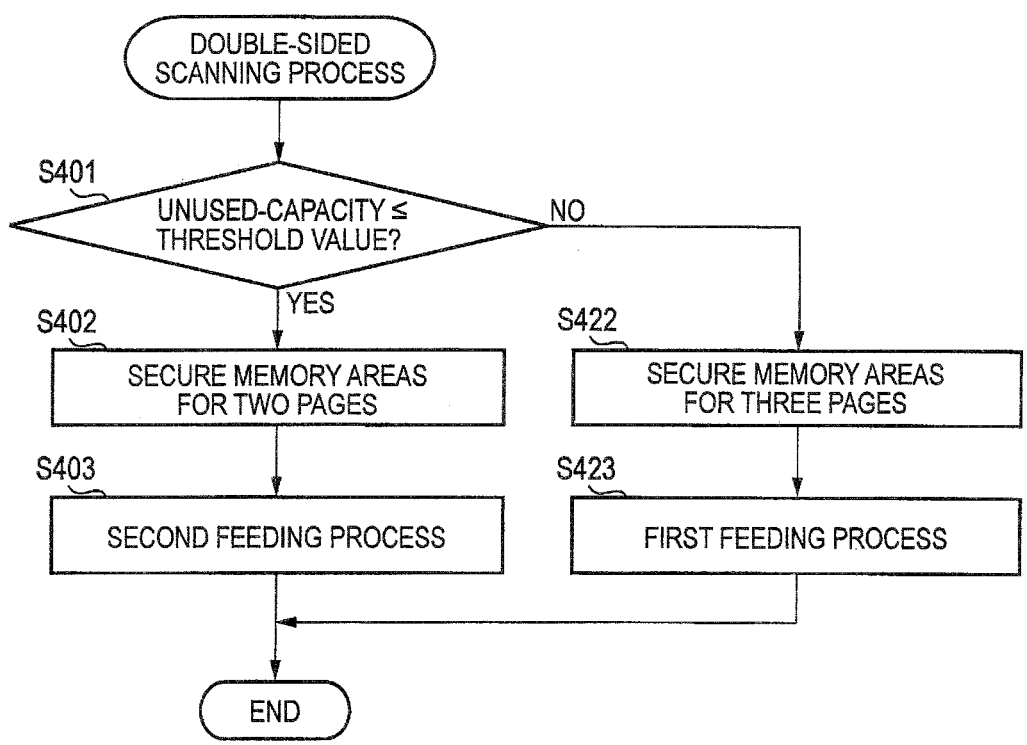
FIG. 8 is a flow chart showing a sequence of a modified exemplary embodiment of a double-sided scanning process.

In the above exemplary embodiment, the first feeding process and the second feeding process are switched depending on the output conditions (output order or printing speed). However, the conditions of switching the feeding processes are not limited thereto. In other words, the feeding processes may be switched depending on whether an unused-capacity of the memory is equal to or smaller than a predetermined value. For example, in the double-sided scanning process of this case, it is determined whether an unused memory capacity is equal to or smaller than a threshold value (step S401), as shown in FIG. 8. When it is determined that the unused-capacity is equal to or smaller than the threshold value (step S401: YES), memory areas for two pages are secured (step S402), then the second feeding process is performed (step S403). On the other hand, when it is determined that the capacity is larger than a threshold value (step S401: NO), memory areas for three pages are secured (step S422), then the first feeding process is performed (step S423).

In addition, for example, a memory may be secured whenever starting the second surface scanning, and an unused-capacity is checked when securing the memory. Consequently, when the unused-capacity is equal to or smaller than a predetermined value, the second feeding process is performed, and when the unused-capacity is larger than a prescribed value, the first feeding process is performed. As described above, the feeding processes may be switched when a memory shortage occurs.

In the above exemplary embodiment, the image scanning unit 2 is provided with the page memories in which the scanned image data is held. However, the page memories may be provided to the image forming unit 1. In other words, the image forming unit 1 may hold the image data and may be performed scanning and printing operations in reverse order.

What is claimed is:

1. An image scanning apparatus comprising:
    a feeding unit that feeds a document;
    an upstream scanning unit that scans an image of one surface of the document fed by the feeding unit;
    a downstream scanning unit, which is arranged at a downstream side of the upstream scanning unit in a document feeding direction, and which scans an image of the other surface of the document fed by the feeding unit;
    a memory unit, which stores both data of the image scanned by the upstream scanning unit and data of the image scanned by the downstream scanning unit; and
    a control unit that controls the document feeding by performing one of a first feeding process and a second feeding process, based on at least one of an unused-capacity of the memory unit and an output condition, the first feeding process being a feeding process in which the upstream scanning unit starts to scan a following document while the downstream scanning unit scans a preceding document, the second feeding process being a feeding process in which the upstream scanning unit starts to scan the following document after the downstream scanning unit scans the preceding document, the control unit determining whether a regular order output mode or a reverse order output mode is set,
    wherein, when the regular order output mode is set, the data of the image scanned by the upstream scanning unit is output earlier than the data of the image scanned by the downstream scanning unit,
    wherein, when the reverse order output mode is set, the data of the image scanned by the upstream scanning unit is output later than the data of the image scanned by the downstream scanning unit, and wherein the control unit performs the first feeding process for the regular order output.

2. The image scanning apparatus according to claim 1, wherein the control unit determines whether an output speed of the image is smaller than a threshold value and performs the second feeding process when the output speed of the image is smaller than the threshold value.

3. The image scanning apparatus according to claim 1, further comprising a detection unit that detects a blank document from the data of the image scanned by the upstream scanning unit, wherein, when the detection unit detects a blank document while feeding the document in the second feeding process, the control unit deletes image data of the blank document from the memory unit, and then the upstream scanning unit starts to scan the following document while the downstream scanning unit scans the preceding document.

4. The image scanning apparatus according to claim 1, wherein the control unit performs the second feeding process when the unused-capacity of the memory unit is equal to or smaller than a predetermined value.

5. An image scanning apparatus comprising:

a feeding unit that feeds a document;

an upstream scanning unit that scans an image of one surface of the document fed by the feeding unit;

a downstream scanning unit, which is arranged at a downstream side of the upstream scanning unit in a document feeding direction, and which scans an image of the other surface of the document fed by the feeding unit;

a memory unit, which stores both data of the image scanned by the upstream scanning unit and data of the image scanned by the downstream scanning unit, the memory unit having a first memory area, used by the upstream scanning unit, and a second memory area, used by the downstream scanning unit, a size of the first memory area being larger than a size of the second memory area; and a control unit that controls the document feeding by performing one of a first feeding process and a second feeding process, based on at least one of an unused-capacity of the memory unit and an output condition, the first feeding process being a feeding process in which the upstream scanning unit starts to scan a following document while the downstream scanning unit scans a preceding document, the second feeding process being a feeding process in which the upstream scanning unit starts to scan the following document after the downstream scanning unit scans the preceding document, and the control unit determining whether a regular order output mode or a reverse order output mode is set, wherein, when the regular order output mode is set, the data of the image scanned by the upstream scanning unit is output earlier than the data of the image scanned by the downstream scanning unit, wherein, when the reverse order output mode is set, the data of the image scanned by the upstream scanning unit is output later than the data of the image scanned by the downstream scanning unit, and wherein, when the first feeding process is performed in the reverse order output mode, memory areas in the memory unit are secured so that the size of the first memory area becomes larger than that of the second memory area.

6. The image scanning apparatus according to claim 5, wherein the control unit determines whether an output speed of the image is smaller than a threshold value and performs the second feeding process when the output speed of the image is smaller than the threshold value.

7. The image scanning apparatus according to claim 5, further comprising a detection unit that detects a blank document from the data of the image scanned by the upstream scanning unit, wherein, when the detection unit detects a blank document while feeding the document in the second feeding process, the control unit deletes image data of the blank document from the memory unit, and then the upstream scanning unit starts to scan the following document while the downstream scanning unit scans the preceding document.

8. The image scanning apparatus according to claim 5, wherein the control unit performs the second feeding process when the unused-capacity of the memory unit is equal to or smaller than a predetermined value.

* * * * *